(12) United States Patent
Choi et al.

(10) Patent No.: US 9,050,776 B2
(45) Date of Patent: Jun. 9, 2015

(54) METHOD OF SYNTHESIS OF HIGH DISPERSED SPHERICAL Y OR NB DOPED LITHIUM TITANATE OXIDE USING TITANIUM TETRACHLORIDE AND LITHIUM HYDROXIDE

(75) Inventors: Byung Hyun Choi, Seoul (KR); Mi Jung Ji, Gwangmyeong-si (KR); Eun Kyung Kim, Incheon (KR); Young Jin Kwon, Seoul (KR); Sung Hun Jung, Seoul (KR); Yong Tae An, Gwangmyeong-si (KR)

(73) Assignee: KOREA INSTITUTE OF CERAMIC ENGINEERING AND TECHNOLOGY, Seoul (KR)

( * ) Notice: Subject to any disclaimer, the term of this patent is extended or adjusted under 35 U.S.C. 154(b) by 73 days.

(21) Appl. No.: 13/600,691

(22) Filed: Aug. 31, 2012

(65) Prior Publication Data

US 2014/0004346 A1 Jan. 2, 2014

(30) Foreign Application Priority Data

Jun. 28, 2012 (KR) .................. 10-2012-0069829

(51) Int. Cl.
*B32B 5/16* (2006.01)
(52) U.S. Cl.
CPC ............. *B32B 5/16* (2013.01); *Y10T 428/2982* (2015.01)

(58) Field of Classification Search
USPC ............................ 428/402; 252/512; 423/598
IPC ..... H01B 1/02; B32B 5/16; C01G 23/04; H01M 4/485
See application file for complete search history.

(56) References Cited

U.S. PATENT DOCUMENTS

| | | | |
|---|---|---|---|
| 7,232,556 B2 * | 6/2007 | Yadav ..................... | 423/592.1 |
| 2011/0274929 A1 * | 11/2011 | Lee et al. .................. | 428/402 |
| 2012/0251885 A1 * | 10/2012 | Ellsworth et al. ......... | 429/231.1 |
| 2013/0004851 A1 * | 1/2013 | Lee et al. .................. | 429/231.1 |
| 2014/0038058 A1 * | 2/2014 | Holzapfel et al. ......... | 429/319 |

* cited by examiner

*Primary Examiner* — Leszek Kiliman
(74) *Attorney, Agent, or Firm* — Ked & Associates, LLP (57) ABSTRACT

The present disclosure relates to a method of synthesis of Lithium Titanate Oxide used for a cathode of Lithium ion battery, the method comprising: (A) diluting $TiCl_4$ with $TiOCl_2$; (B) adding $YCl_3$ or $NbCl_5$ at the rate of 0.1~2 mol % to Ti(mol); (C) forming a complex salt by dissolving to put at least one selected from a group consisting of Hydroxy propyl cellulose or Polyethylene glycol in a solvent, the Hydroxy propyl cellulose being a complexing agent and being a dispersing agent as well, whereas the Polyethylene glycol being a dispersing agent; (D) synthesizing a titanium precursor by adding an aqueous ammonia solution; (E) preparing Y or Nb doped titanium dioxide($TiO_2$) powder by heat-treating the synthetic product in a temperature of 500~700° C.; and (F) mixing the Y or Nb doped $TiO_2$ powder with $LiOH.H_2O$ and heat-treating the mixture in a temperature of 800~900° C.

5 Claims, 7 Drawing Sheets

METHOD OF SYNTHESIS OF HIGH DISPERSED SPHERICAL Y OR NB DOPED LITHIUM TITANATE OXIDE USING TITANIUM TETRACHLORIDE AND LITHIUM HYDROXIDE

CROSS-REFERENCE TO RELATED APPLICATION

This application claims the benefit of Korean Patent Application No. 10-2012-0069829 filed on Jun. 28, 2012, which is herein incorporated by reference as if fully set forth herein.

BACKGROUND OF THE INVENTION

The present disclosure generally relates to synthesis of high dispersed spherical Y or Nb doped Lithium Titanate Oxide, and more particularly, to a technique of synthesis of nanoscale high dispersed spherical Y or Nb doped $Li_4Ti_5O_{12}$, the technique comprising, in doping Y or Nb on $TiCl_4$ to synthesize a titanium precursor, adding Hydroxy propyl cellulose and Polyethylene glycol together, the former being a complexing agent and being a dispersing agent as well, whereas the latter being a dispersing agent, to prepare Ti-precursor, and then adding the precursor and lithium hydroxide.

In preparation for new next generation Lithium secondary battery such as storage devices for a Hybrid Electric Vehicle (HEV) or a Plug-in Hybrid/Electric Vehicle (PHEV), low-priced materials exhibiting high capacity, high power output and stability are required. In case of commercialized carbon materials, their operating voltage is low, and therefore they can satisfy the above conditions by mixing them with metal oxides etc. to use them.

On the other hand, the operating voltage of Lithium Titanate Oxide is high, i.e., 1.5V, and it is therefore in the spotlight as a cathode material of Lithium ion batteries, which is promising as a reversible reaction due to structural stability that there is little or no change of lattice volume in time of insertion/secession of Lithium.

However, the Lithium Titanate Oxide exhibits a low electrical conductivity and fails to be charged or discharged at a high speed, and moreover it has a low power density per unit volume, and therefore many ways to overcome such problems have been studied.

Therefore, the present inventors prepared low-priced $TiCl_4$ as a basic raw material, and then added Hydroxy propyl cellulose or ethylene glycol, the former being a complexing agent and being a dispersing agent of $TiCl_4$ as well, whereas the latter being a dispersing agent of $TiCl_4$, and studied that a spherical Lithium Titanate Oxide could be synthesized thereby and further studied on doping metal ions on materials in order to improve their electrochemical properties and enable them to have a high output, and consequently the present disclosure has been completed.

SUMMARY OF THE INVENTION

The present disclosure provides a method of synthesis of high dispersed spherical Y or Nb doped Lithium Titanate Oxide to improve its electrochemical properties and enable it to have a high output for use in fabricating a cathode of Lithium ion battery.

According to an aspect of the present disclosure, a method of synthesis of high dispersed spherical Y or Nb doped lithium titanate oxide is disclosed, the method comprising: (A) diluting $TiCl_4$ with $TiOCl_2$; (B) adding $YCl_3$ or $NbCl_5$ at the rate of 0.1~2 mol % to Ti(mol); (C) forming a complex salt by dissolving to put at least one selected from a group consisting of Hydroxy propyl cellulose and Polyethylene glycol in a solvent, said Hydroxy propyl cellulose being a complexing agent and being a dispersing agent as well, whereas said Polyethylene glycol being a dispersing agent; (D) synthesizing a titanium precursor by adding an aqueous ammonia solution; (E) preparing Y or Nb doped titanium dioxide($TiO_2$) powder by heat-treating said synthetic product in a temperature of 500~700° C.; and (F) mixing said Y or Nb doped $TiO_2$ powder with $LiOH \cdot H_2O$ and heat-treating said mixture in a temperature of 800~900° C.

Advantageously, the concentration of $TiCl_4$ in said step (A) is 1.6~1.8 mole/l. In said step (C), Hydroxy propyl cellulose, Polyethylene glycol or their mixture is dissolved to input in isopropyl alcohol, said isopropyl alcohol being a solvent, wherein said Polyethylene glycol is advantageously 0.07~1.0 mole % (the concentration of 0.02~0.04 mole/l), said Polyethylene glycol is 0.1~1.2 mole %, Polyethylene glycol and Hydroxy propyl cellulose is 0.1~0.5 mole %. Furthermore, it is advantageous that the concentration of the aqueous ammonia solution used in said step (D) is 1.8~9.8 mole/l.

According to another aspect of the present disclosure, high dispersed spherical Y or Nb doped Lithium Titanate Oxide synthesized according to one of said methods of synthesis is disclosed, the high dispersed spherical Y or Nb doped Lithium titanate oxide is as indicated below:

The present disclosure uses low-priced $TiCl_4$, thereby being economical, doping Y or Nb effectively, and deriving complex salts to be high dispersed without any agglomerating by adding a complexing agent and a dispersing agent, thereby improving electrochemical properties of Lithium Titanate Oxide without changing its particle size or its tap density. Therefore, an excellent Lithium Titanate Oxide can be obtained, the Lithium Titanate Oxide being used in fabrication of an active material of a super capacitor or a cathode of a Lithium ion secondary battery.

DETAILED DESCRIPTION OF THE INVENTION

In the following description, the present disclosure is described in detail.

In general, there is a problem in active materials that as the size of particles is smaller, the property of reaction rate is more excellent, whereas the density of electrodes is lower, thereby an expressible capacity per unit volume is smaller. In particular, in case of nanoscale particles, a void fraction within electrodes after the fabrication of electrodes increases, thereby the density of electrodes becomes lower. In contrast, as the size of particles of active materials is larger, the volume of void existing between particles is reduced, thereby the density of an electrode is larger, whereas the migration distance of Lithium ions inside particles increases, thereby the property of reaction rate get worse.

According to the present disclosure, the Lithium Titanate Oxide is synthesized by adjusting the type and the amount of additives when spherical titanium hydroxide is synthesized, thereby optimizing the size of particles of the titanium hydroxide and adding lithium hydroxide in the titanium hydroxide as well, and then heat-treating them. In synthesizing the titanium hydroxide, Hydroxy propyl cellulose or Polyethylene glycol is used as additives, thereby the growth of particles, the shape of particles and the particle size distribution are adjusted, and Yttrium chloride or niobium chloride is added. Therefore, the present disclosure can improve its electrochemical properties.

According to an embodiment of the present disclosure, a method of high dispersed spherical Y or Nb doped Lithium Titanate Oxide is provided, the method comprising: (A) diluting $TiCl_4$ with $TiOCl_2$; (B) adding $YCl_3$ or $NbCl_5$ at the rate of 0.1~2 mol % to Ti(mol); (C) forming a complex salt by dissolving to put Hydroxy propyl cellulose or Polyethylene glycol solely, or Polyethylene glycol and Hydroxy propyl cellulose at the same time, in a solvent, said Hydroxy propyl cellulose being a complexing agent and being a dispersing agent as well, whereas said Polyethylene glycol being a dispersing agent; (D) synthesizing a titanium precursor by adding an aqueous ammonia solution; (E) preparing Y or Nb doped titanium dioxide($TiO_2$) powder by heat-treating said synthetic product in a temperature of 500~700° C.; and (F) mixing said Y or Nb doped $TiO_2$ powder with $LiOH.H_2O$ and heat-treating said mixture in a temperature of 800~900° C.

In said step (A), $TiCl_4$ is mixed with distilled water to be diluted. In this regard, it is advantageous that the concentration of an aqueous titanium salt solution is 1.6~1.8 mole/l. In said step (B), $YCl_3$ or $NbCl_5$ is added as an element for improving its electrochemical properties. In this regard, it is advantageous that the added amount of the element is the rate of 0.1~2 mol % to Ti(mol). It is more advantageous that the added amount of the element is the rate of as much as or less than 1 mol %. In case of less than 0.1 mol %, the improvement effect of its electrochemical properties is too little, whereas in case of more than 2 mol %, there is a problem exceeding its solubility limit to form impurities. In said step (C), Hydroxy propyl cellulose, Polyethylene glycol, or Hydroxy propyl cellulose and Polyethylene glycol is dissolved to add in a solvent. In this regard, IsoPropyl alcohol may be used as a solvent, and advantageously, the input of Hydroxy propyl cellulose is 0.07~1.0 mole %, the input of polyethylene glycol is 0.1~1.2 mole %, the input of Polyethylene glycol and Hydroxy propyl cellulose is 0.1~0.5 mole %. It is advantageous that the temperature in said mixing is 40° C.~60° C. In this regard, if Hydroxy propyl cellulose or Polyethylene glycol is input more, particles grow excessively, thereby it is difficult to control the size of particles, the shape of particles, and the distribution of the size of particles, thereby Hydroxy propyl cellulose or Polyethylene glycol cannot be removed completely by filtering and cleaning process, and therefore it is apprehended that Hydroxy propyl cellulose or Polyethylene glycol will remain in the resulting product. Furthermore, it is advantageous that the concentration of the aqueous ammonia solution is 1.8~9.8 mole/l in said step (D). titanium dioxide powder in the anatase phase is obtained by the reaction of said step (E). Then, said powder is mixed to react with Lithium hydroxide, and therefore high dispersed nanoscale spherical Y or Nb Lithium Titanate Oxide is synthesized.

By said method of synthesis, high dispersed spherical Lithium Titanate Oxide indicated as $Li_4Ti_{5-x}M_xO_{12}$((wherein M is Y or Nb, and 0.005≤x≤0.1) is synthesized.

As a result of observation with SEM, in case that Yttrium chloride ($YCl_3$) or Niobium chloride is added at the rate of 0.1, 0.5, 1, 2 mol % to Ti (mol) respectively, the size of particles did not vary depending on the doping condition, and as a result of measurement of the tap density of spherical particles, it showed high values.

As a result of analysis of XRD pattern, although the added amount of Y increased, $Li_4Ti_5O_{12}$ having a Cubic spinel structure is observed, and it is found that Y ions are doped within the spinal structure without structural transformation. Furthermore, after fabricating electrodes and cells using the synthesized high dispersed spherical Y or Nb doped Lithium Titanate Oxide, the present inventors analyzed their electrochemical behaviors. As a result, it is found that the doping of Y or Nb contributes to improvement of conductivity within Lithium Titanate Oxide(Y or Nb doped $Li_4Ti_5O_{12}$), thereby the rate of reaction in an active material of Lithium is improved, and thereby the output property and the charge or discharge property of a battery is improved.

In the electrochemical property depending on Y doping, it is found that comparing the capacity in the temperature of 0.2° C., the capacity of $Li_4Ti_5O_{12}$ is 129 mAh/g, whereas the capacity of Y doped $Li_4Ti_5O_{12}$ is 147 mA/g. Moreover, comparing the persistency rate of capacity, that of $Li_4Ti_5O_{12}$ is 74%, whereas that of Y doped $Li_4Ti_5O_{12}$ is 92%. In other words, both the capacity property and output property are improved as a result of Y doping. The present inventors observed the resistance decrement of a SEI layer and the decrement of the polarization phenomenon depending on Y doping with the circulating current method and the electrochemical impedance spectroscopy. In other words, when Y ions are doped on $Li_4Ti_5O_{12}$, thereby the insertion/secession reaction rate of Li ion is improved, and the SEI layer can be restrained from being formed on the interface between an active material/an electrolyte, thereby the battery property of the active material is improved.

EXAMPLES

In the following description, the present disclosure is described with the examples in more detail.

However, the following examples are only intended to illustrate the present disclosure, the scope of the present disclosure is not limited to the following examples.

Example 1

Synthesis of Y Doped Lithium Titanate Oxide

Prior to synthesizing $Li_4Ti_5O_{12}$, the present inventors mixed $TiCl_4$ with distilled water in a low temperature, weighed and diluted it to become 0.05 mol of $TiOCl_2$ solution in order to synthesize a Ti-precursor. The present inventors added 1 mol % of $YCl_3 6H_2O$ to Ti(mol) while weighed $TiCl_4$ in the synthesis process of the Ti-precursor in order to synthesize Y doped $Li_4Ti_5O_{12}$. The present inventors dissolved Hydroxy propyl cellulose and Polyethylene glycol together in a solvent, i.e., 1-propanol, thereby used the solution as a dispersing agent, and reacted to synthesize it in a temperature of 50° C. Then, the present inventors added 9.8 mole/l of an aqueous ammonia solution to synthesize a titanium precursor. Then, the present inventors heat-treated the synthetic product in a temperature of 600° C. to obtain anatase $TiO_2$ powder, and then mixed it with Lithium hydroxide and heat-treated the mixture in a temperature of 850° C., and therefore synthesized high dispersed spherical Y doped Lithium Titanate Oxide.

Example 2

Synthesis of Y Doped Lithium Titanate Oxide

Prior to synthesizing $Li_4Ti_5O_{12}$, the present inventors mixed $TiCl_4$ with distilled water, weighed and diluted it to become 0.05 mol of $TiOCl_2$ solution in order to synthesize a Ti-Precursor. The present inventors added 2 mol % of $YCl_3 6H_2O$ to Ti(mol) while weighed $TiCl_4$ in the synthesis process of the Ti-precursor in order to synthesize Y doped $Li_4Ti_5O_{12}$. The present inventors dissolved Hydroxy propyl cellulose in a solvent, i.e., 1-propanol, thereby used the solution (0.07 mole %) as a dispersing agent, and reacted to synthesize it in a temperature of 50° C. Then, the present inventors added 9.8 mole/l of an aqueous ammonia solution to synthesize a titanium precursor. Then, the present inventors heat-treated the synthetic product in a temperature of 600° C. to obtain anatase $TiO_2$ powder, and then mixed it with Lithium hydroxide and heat-treated the mixture in a temperature of 850° C., and therefore synthesized high dispersed spherical Y doped Lithium Titanate Oxide.

Example 3

Synthesis of Nb Doped Lithium Titanate Oxide

Prior to synthesizing $Li_4Ti_5O_{12}$, the present inventors mixed $TiCl_4$ with distilled water in a temperature of 10° C. or less than 10° C., weighed and diluted it to become 0.05 mol of $TiOCl_2$ solution in order to synthesize a Ti-Precursor. The present inventors added 0.5 mol % of $NbCl_5$ hydrate to Ti(mol) while weighed $TiCl_4$ in the synthesis process of the Ti-precursor in order to synthesize Nb doped $Li_4Ti_5O_{12}$. The present inventors dissolved Hydroxy propyl cellulose and Polyethylene glycol together in a solvent, i.e., 1-propanol, thereby used the solution as a dispersing agent, and reacted to synthesize it in a temperature of 50° C. Then, the present inventors added 9.8 mole/l of an aqueous ammonia solution to synthesize a titanium precursor. Then, the present inventors heat-treated the synthetic product in a temperature of 600° C. to obtain anatase $TiO_2$ powder, and then mixed it with Lithium hydroxide and heat-treated the mixture in a temperature of 850° C., and therefore synthesized high dispersed spherical Nb doped Lithium titanate oxide.

Example 4

Synthesis of Nb Doped Lithium Titanate Oxide

Prior to synthesizing $Li_4Ti_5O_{12}$, the present inventors mixed $TiCl_4$ with distilled water, weighed and diluted it to become 0.05 mol of $TiOCl_2$ solution in order to synthesize a Ti-precursor. The present inventors added 2 mol % of $NbCl_5$ hydrate to Ti(mol) while weighed $TiCl_4$ in the synthesis process of the Ti-precursor in order to synthesize Nb doped $Li_4Ti_5O_{12}$. The present inventors dissolved Hydroxy propyl cellulose in a solvent, i.e., 1-propanol, thereby used the solution as a dispersing agent, and reacted to synthesize it in a temperature of 50° C. Then, the present inventors added 9.8 mole/l of an aqueous ammonia solution to synthesize a titanium precursor. Then, the present inventors heat-treated the synthetic product in a temperature of 600° C. to obtain anatase $TiO_2$ powder, and then mixed it with Lithium hydroxide and heat-treated the mixture in a temperature of 850° C., and therefore synthesized high dispersed spherical Nb doped Lithium Titanate Oxide.

Comparison Example 1

Synthesis of Lithium Titanate Oxide

The present inventors synthesized a Y or Nb undoped Lithium titanate oxide as a comparison example. Prior to synthesizing $Li_4Ti_5O_{12}$, the present inventors mixed $TiCl_4$ with distilled water, weighed and diluted it to become 0.05 mol of $TiOCl_2$ solution in order to synthesize a Ti-precursor. The present inventors dissolved Hydroxy propyl cellulose and Polyethylene glycol together in a solvent, i.e., 1-propanol, thereby used the solution as a dispersing agent, and reacted to synthesize it in a temperature of 50° C. Then, the present inventors heat-treated the synthetic product in a temperature of 600° C. to obtain anatase $TiO_2$ powder, and then mixed it with Lithium hydroxide and heat-treated the mixture in a temperature of 850° C., and therefore synthesized a spherical Lithium Titanate Oxide.

Comparison Example 2

Synthesis of Lithium Titanate Oxide

The present inventors synthesized a Lithium Titanate Oxide where a dispersing agent, i.e. Hydroxy propyl cellulose was not added, as a comparison example. Prior to synthesizing $Li_4Ti_5O_{12}$, the present inventors mixed $TiCl_4$ with distilled water, weighed and diluted it to become 0.05 mol of $TiOCl_2$ solution in order to synthesize a Ti-percursor. The present inventors added 2 mol % of $YCl_3 6H_2O$ to Ti(mol) while weighed $TiCl_4$ in the synthesis process of the Ti-precursor in order to synthesize Y doped $Li_4Ti_5O_{12}$. Then, the present inventors added 9.8 mole/l of an aqueous ammonia solution to synthesize a titanium precursor. Then, the present inventors heat-treated the synthetic product in a temperature of 600° C. to obtain anatase $TiO_2$ powder, and then mixed it with Lithium hydroxide and heat-treated the mixture in a temperature of 850° C., and therefore synthesized Y doped Lithium Titanate Oxide.

Test Example 1

Observation of Microstructure

Figure 1:
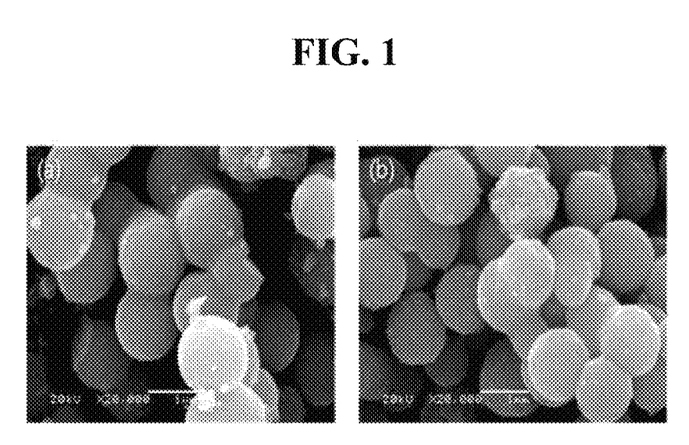
FIG. 1 is a picture representing a result of SEM analysis of high dispersed spherical Y or Nb doped Lithium Titanate Oxide according to an embodiment of the present disclosure.

The present inventors observed shapes of particles of the samples in the above example 2 and the comparison example 1 synthesized depending on Y dopant content with SEM. The result is shown in FIG. 1. FIG. 1 shows that the powder of Y doped example 2((b) in FIG. 1) have uniform particle distribution of 1~1.5 and is well distributed in a spherical shape. In other words, the present inventors observed that the size of particles little changed depending on the Y doping, and when measuring the tap density of the spherical particles, its value was comparatively high, i.e., 1.15 g/cm$^3$.

Test Example 2

Observation of Microstructure

Figure 2:
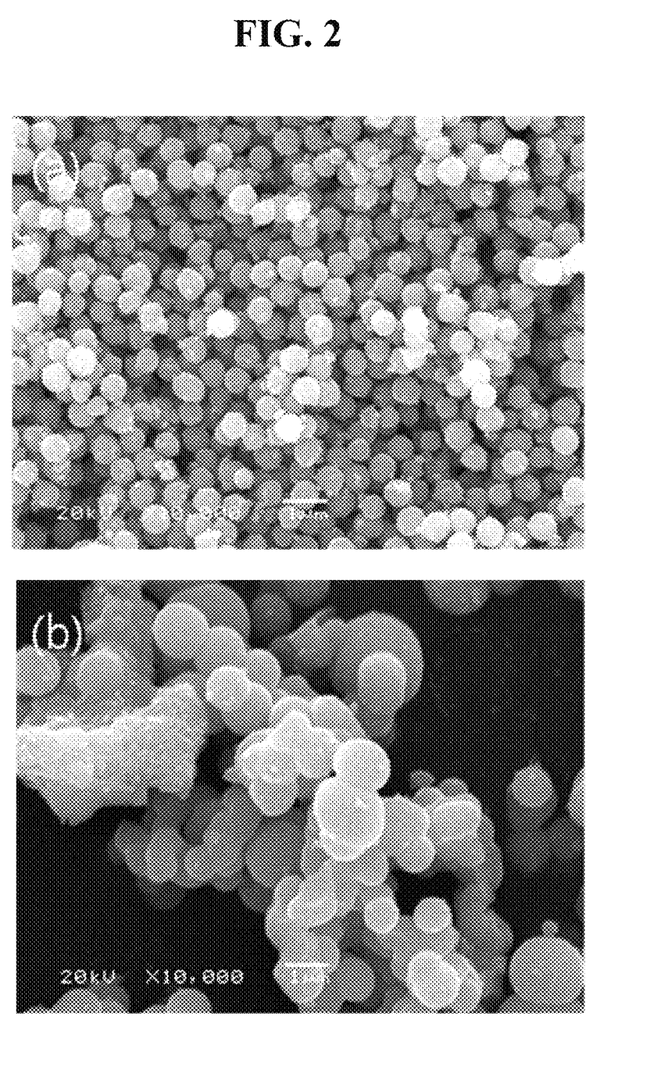
FIG. 2 is a SEM picture observed depending on whether a dispersing agent is added or not, according to an embodiment of the present disclosure.

The present inventors observed shapes of particles of the Lithium Titanate Oxide synthesized in case of adding a dispersing agent, i.e. Hydroxy propyl cellulose and in case of not adding it, with SEM. The result is shown in FIG. 2. FIG. 2(b) shows that the Lithium Titanate Oxide of the comparison example 2 where Hydroxy propyl cellulose was not added is not uniform in the size of particles and the agglomerated phenomenon appeared. Compared to the comparison example 2, FIG. 2(a) shows that the Lithium titanate oxide of the example 2 where Hydroxy propyl cellulose was added, has spherical shape of particles, wherein the size of particles is uniform.

Test Example 3

X-ray Diffraction Analysis

The present inventors implemented the XRD analysis of $Li_4Ti_{5-g}M_gO_{12}$ (in case of the comparison example 1, x=0, in case of the example 1, x=0.05, in case of the example 2, x=0.1) per the doping concentration of samples synthesized in the example 1, 2 and the comparison 1. The result is shown in FIG. 3.

Figure 3:
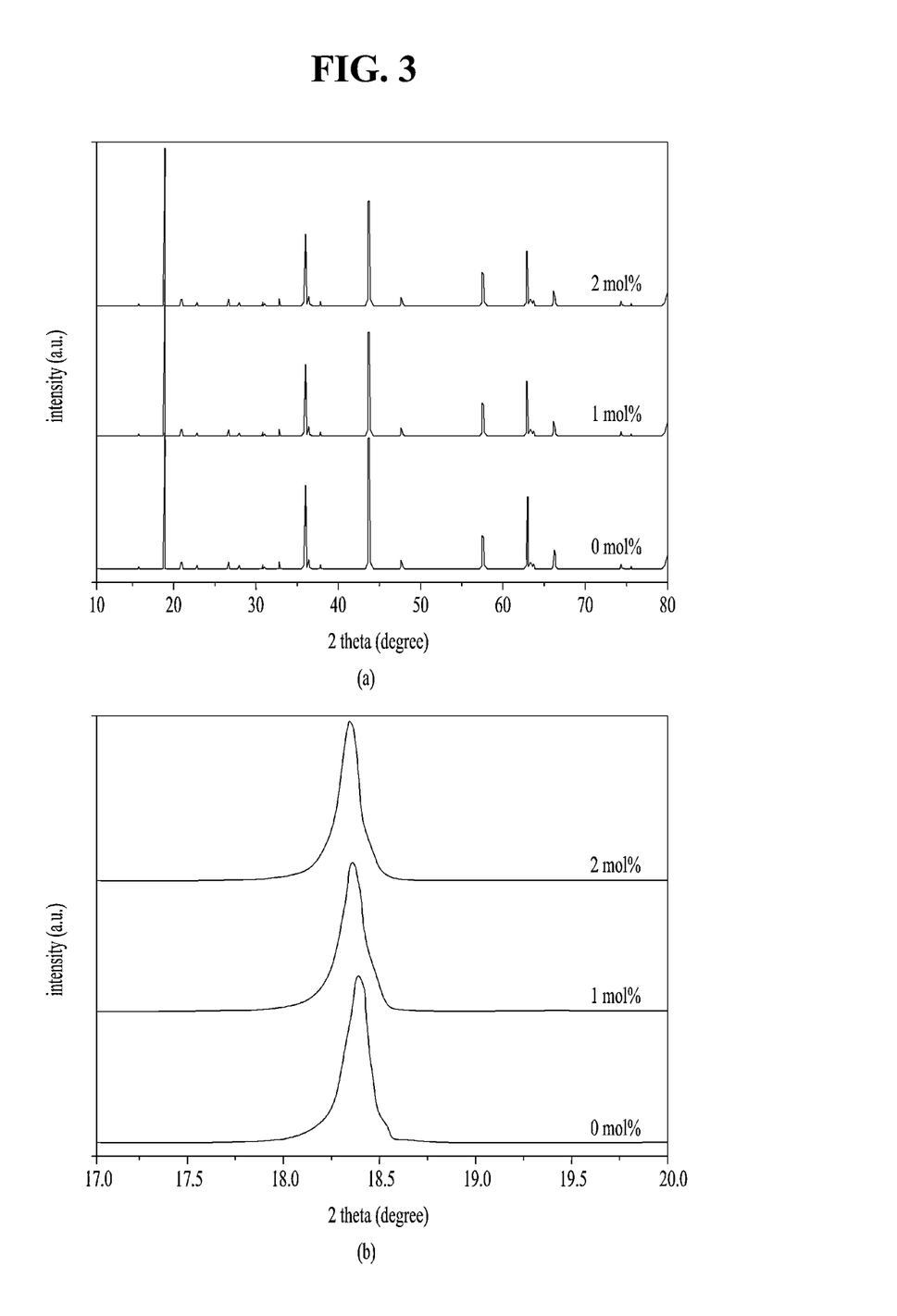
FIG. 3 is a graph representing a result of XRD analysis spherical Y doped Lithium Titanate Oxide, according to an embodiment of the present disclosure.

As can be seen in (a) of FIG. 3, it is observed that although the added amount of Y increases, each peak is $Li_4Ti_{5-g}M_gO_{12}$ having a cubic spinel structure. Therefore, it is considered that Y ion is doped without any structural transformation within the spinel structure.

On the other hand, it is observed that each value of peaks due to dopant Y tends to decrease according to the increase of doping concentration, thereby the crystallinity due to dopant Y decreases. Moreover, as can be seen (b) of FIG. 3 magnifying the peak location in (1 1 1) face, it can be seen that its peak migrates to a lower angle. This is due to the Y doping. In the table 1 below, lattice constant of each sample using Rietveld refinement method is indicated. The difference of radius of Y and Ti ion can account for the location migration of the peak on XRD patterns depending on the increment of Dopant Y concentration. The ion radius of $Y^{3+}$, i.e., 0.1019 nm is larger than the ion radius of $Ti^{4+}$, i.e., 0.080 nm. Therefore, as can be seen the table 1, the lattice constant increase gradually depending on the increment of Dopant Y concentration, and therefore the peak corresponding to each face migrates to a lower angle.

TABLE 1

| | α (Å) |
|---|---|
| Comparison example 1 (0 mol %) | 8.3538 |
| Example 1 (1 mol %) | 8.3642 |
| Example 2 (2 mol %) | 8.3728 |

As can be seen in (a) of FIG. 3, when 2 mol % of Y is doped, $Y_2Ti_2O_7$ peak which is indicated as an inverted triangle mark appears to be a small amount. This is impurities formed by reaction of residual $TiO_2$ with the unsoluble dopant Y within the spinel structure, which accounts for the solubility limit of $Y^{3+}$ ion of the spinel structure.

Test Example 4

Electrochemical Behavior Test

In order to observe the electrochemical property of the synthesized $Li_4Ti_5O_{12}$ depending on Y doping, the present inventors used $Li_4Ti_5O_{12}$ as an electrode active material and mixed the active material, a binder(e.g., PVDF) and a conductive material(e.g., Super-P) at the rate of 80:10:10(wt %) respectively and use NMP to prepare a slurry. Then, the present inventors fabricated an electrode by making the slurry layered on an Al foil like a sheet. Then, the present inventors used the fabricated electrode as a working electrode, and used a Lithium foil as a reference electrode and a counter electrode, thus, fabricated a standard coin type cell of CR2032. In this case, Celgard 2400 was used as a separator.

(1) CV Curve

Figure 4:
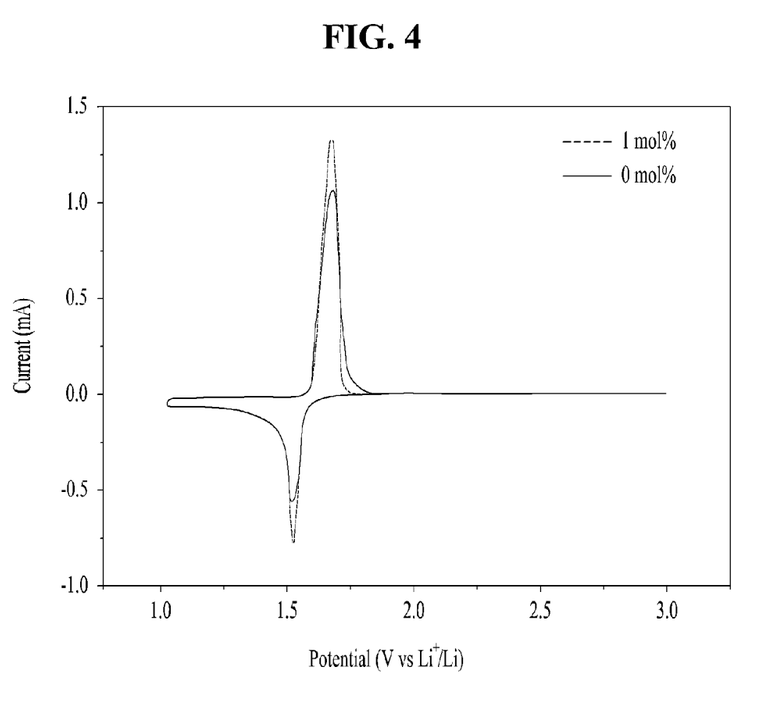
FIG. 4 is a graph representing a CV curve of spherical Lithium Titanate Oxide before or after Y doping, according an embodiment of the present disclosure.

The present inventors observed the effect of doping with CV. The result is represented in FIG. 4. Two peaks meaning insertion/secession reaction of Lithium can be observed with C-V curve. In this regard, it means that the larger heights of two peaks are, the faster the electrochemical reaction of Lithium is occurred, and the narrower the distance between two peaks are, the less the polarization phenomenon occurred in charge and discharge is. As can be seen in the C-V curve of FIG. 4, the distance between two peaks get narrower and the heights of peaks get larger depending on Y doping. Therefore, it is considered that Y doping contributes to the improvement of conductivity within LTO materials, thus, can improves the reaction rate of Lithium in an active material.

(2) Charge and Discharge Property Test

Figure 5A:
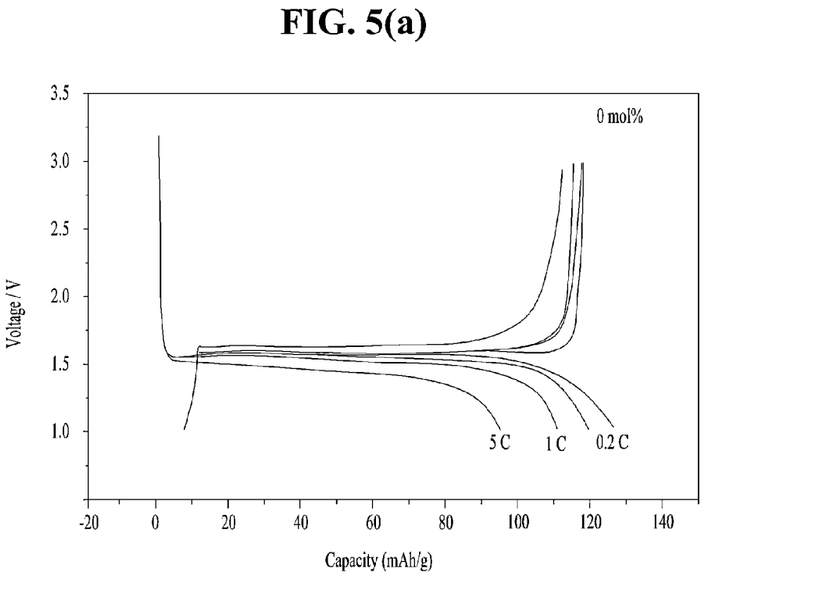
FIG. 5 is graph representing charge and discharge properties of spherical Lithium Titanate Oxide depending on Y and Nb doping, according to an embodiment of the present disclosure.
Figure 5B:
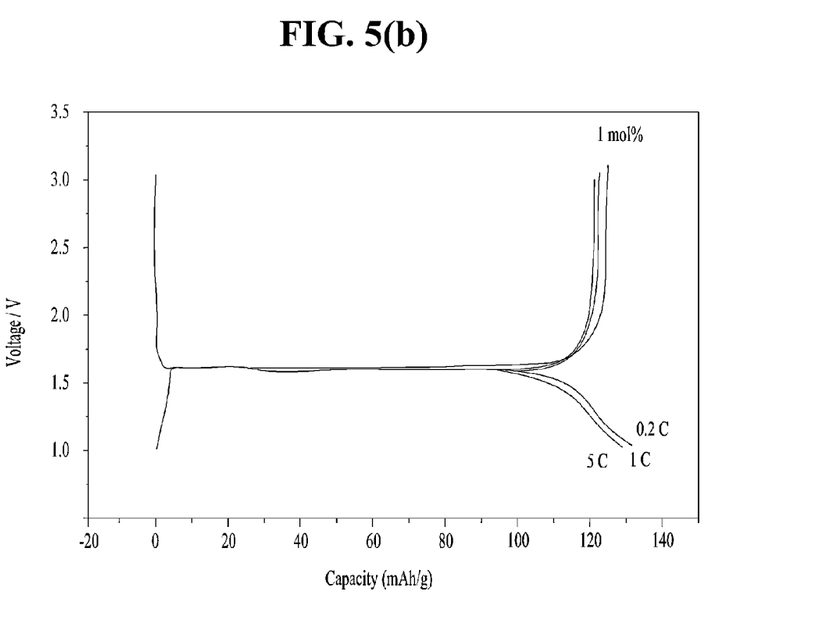
Figure 5C:
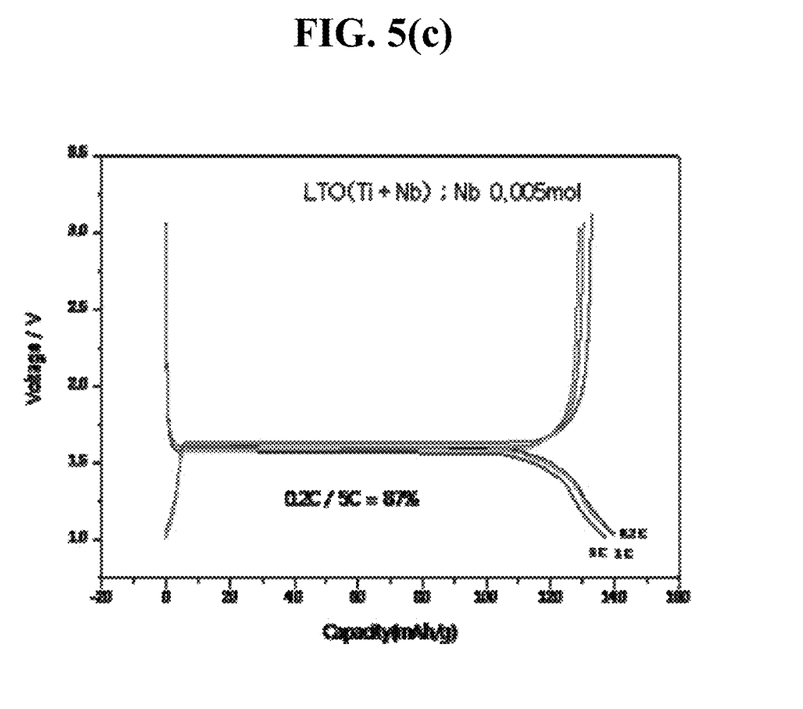

The present inventors applied LTO samples fabricated depending on change of Y doping concentration as an active material to a half coin cell, the result of their charge and discharge property is represented in FIG. 5. A high rate property in the range of 0.2~5° C. under 1.0~3.0 cut-off Voltage was measured. The (a) in FIG. 5 shows the charge and discharge curve of Y undoped LTO, where a typical inherent flat voltage of 1.5V appeared in 0.2° C., and initial discharge capacity was 129 mAh/g. Moreover, the (a) in FIG. 5 shows that the rate of capacity maintenance of 5° C. to 0.2° C. is 74%. On the other hand, the (b) in FIG. 5 shows the charge and discharge curve of 1 mol % of Y doped LTO. As can be seen in the (b) of FIG. 5, the initial discharge capacity in 0.2° C., i.e., 147 mAh/g went up to about 15% as compared to an existing LTO, and the rate of capacity maintenance of 5° C. to 0.2° C. is also 92%. Therefore, the present inventors could observe the improvement of output property depending on Y doping.

Figure 6:
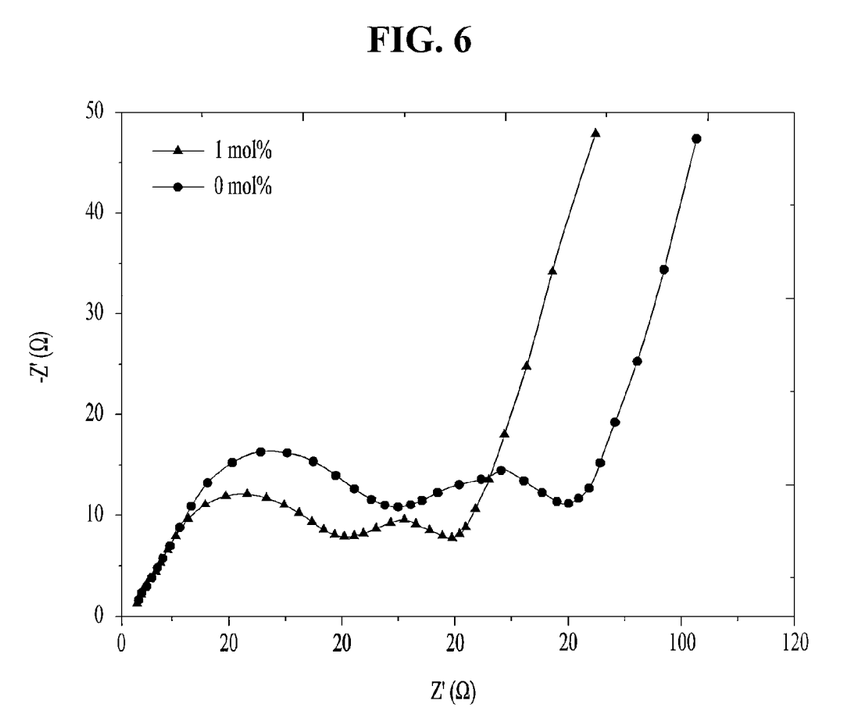
FIG. 6 is a graph representing an EIS spectrum of spherical Lithium Titanate Oxide depending on Y doping, according to an embodiment of the present disclosure.

Furthermore, the present inventors measured impedance using EIS, the result is represented in FIG. 6. In Nyquist plot using EIS, the values of Rs, Rf and Rct can be observed. Rs means ohmic contact resistance values between electrodes, Rf means resistance values formed in interface of an active material and an electrolyte and created in SEI layers, and Rct means resistance values appearing in charge transfer. As can be seen in the shape of curve in FIG. 6, Rs values did not show a large deviation depending Y doping or undoping, but Rf values decreased considerably. The reason is that Y doping resulted in the restraint effect or the reduction effect of thickness of SEI layer formation, the SEI layer being the contacting interface of an electrolyte and an active material formed, which contributed to improvement of charge and discharge property of materials.

Test Example 5

Dispersibility Test

In order to evaluate dispersibility depending on added amounts of dispersing agents, the present inventors prepared Lithium Titanate Oxide which was synthesized by the method of the above example 2 and had compositions of the table 2 below, and then evaluated their dispersibility. The result is represented in the table 2 below.

TABLE 2

| Dispersing agents | Added amounts (mol %) | State of dispersion | Note |
|---|---|---|---|
| Hydroxy propyl cellulose | 0.07 | ○ | ○: good |
|  | 0.08 | ○ | Δ: medium |
|  | 0.09 | Δ | X: bad |
|  | 0.1 | Δ |  |
| Polyethylene glycol | 0.1 | ○ |  |
|  | 0.2 | ○ |  |
|  | 0.3 | ○ |  |
|  | 0.6 | X |  |
|  | 0.9 | X |  |
|  | 1.2 | X |  |
| Hydroxy propyl cellulose + Polyethylene glycol | 0.1 | ○ |  |
|  | 0.2 | ○ |  |
|  | 0.3 | ○ |  |
|  | 0.4 | ○ |  |
|  | 0.5 | ○ |  |

What is claimed is:

1. A method for synthesis of high dispersed spherical lithium titanate oxide with yttrium (Y) or niobium (Nb), the method comprising the steps of:
   (A) diluting titanium tetroxide ($TiCl_4$) with titanium oxide dichlolride ($TiOCl_2$) to form a dilution;
   (B) adding yttrium chloride ($YCl_3$) or niobium chloride ($NbCl_5$) to the dilution in an amount of 0.1~2 mol % based on moles of titanium (Ti) to form a first product;
   (C) dissolving in a solvent at least one selected from a group consisting of hydroxypropyl cellulose, which serves as a complexing agent and a dispersing agent, and polyethylene glycol, which serves as a dispersing agent, to form a solution, and adding the solution to the first product of step (B), thereby forming a complex;
   (D) synthesizing a titanium precursor by adding an aqueous ammonia solution to the complex to form a second product;
   (E) preparing Y— or Nb—-doped titanium dioxide ($TiO_2$) powder by heat-treating the second product of step (D) at a temperature between 500~700° C.; and
   (F) mixing said Y— or Nb—-doped $TiO_2$ powder with lithium hydroxide ($LiOH.H_2O$) to form a mixture and heat-treating the mixture at a temperature between 800~900° C.

2. The method of claim 1, wherein the concentration of $TiOCl_2$ solution in said step (A) is 0.05 mole.

3. The method of claim 1, wherein hydroxypropyl cellulose, polyethylene glycol or a combination of polyethylene glycol and hydroxypropyl cellulose in step (C) is dissolved in isopropyl alcohol to form the solvent.

4. The method of claim 3, wherein hydroxypropyl cellulose is added in an amount of 0.07~1.0 mole % based on the moles of titanium, polyethylene glycol is added in an amount of 0.1~1.2 mole % based on the moles of titanium, and the combination of polyethylene glycol and hydroxypropyl cellulose is added in an amount of 0.1-0.5 mole % based on the moles of titanium.

5. High dispersed spherical Y or Yb doped Lithium titanate oxide as indicated below synthesized according to the method of any one of claim 1 to 4,
$Li_4Ti_{5-x}M_xO_{12}$ (wherein M is Y or Nb, and $0.005 \leq x \leq 0.1$).

* * * * *